(12) United States Patent
Yin et al.

(10) Patent No.: US 12,159,553 B2
(45) Date of Patent: Dec. 3, 2024

(54) RUBIK'S CUBE OF CHINESE CHARACTERS

(71) Applicant: Jianhua Yin, Jiangsu (CN)

(72) Inventors: Te Na Er Yin, Shanghai (CN); Jianhua Yin, Nantong (CN)

(73) Assignee: Jianhua Yin, Nantong (CN)

( * ) Notice: Subject to any disclaimer, the term of this patent is extended or adjusted under 35 U.S.C. 154(b) by 655 days.

(21) Appl. No.: 17/440,470

(22) PCT Filed: Sep. 1, 2020

(86) PCT No.: PCT/CN2020/112872
§ 371 (c)(1),
(2) Date: Sep. 17, 2021

(87) PCT Pub. No.: WO2021/179552
PCT Pub. Date: Sep. 16, 2021

(65) Prior Publication Data
US 2022/0157186 A1 May 19, 2022

(30) Foreign Application Priority Data
Mar. 13, 2020 (CN) .......................... 202010176174.9

(51) Int. Cl.
*G09B 19/06* (2006.01)
*F21V 33/00* (2006.01)
(Continued)

(52) U.S. Cl.
CPC .......... *G09B 5/062* (2013.01); *F21V 33/0004* (2013.01); *G09B 19/08* (2013.01); *F21Y 2115/10* (2016.08)

(58) Field of Classification Search
CPC ......... G09B 19/06; G09B 19/08; G09B 25/00
(Continued)

(56) References Cited

U.S. PATENT DOCUMENTS 4,846,687 A * 7/1989 White ................. G09B 21/009
434/167
6,358,059 B1 * 3/2002 Li .......................... G09B 17/00
434/167
(Continued)

FOREIGN PATENT DOCUMENTS

CN 87202233 U 12/1987
CN 2090087 U 12/1991
(Continued)

*Primary Examiner* — Kurt Fernstrom
(74) *Attorney, Agent, or Firm* — Birchwood IP

(57) ABSTRACT

A cube of Chinese characters is provided, which includes a 3D dictionary. Initials are vertically arranged and finals are horizontally arranged on a front of the 3D dictionary. A character cell is provided at an intersection of each initial and each final. A character rod is provided in each character cell. A phonetic combination corresponding the initial and final is provided on a front of the character rod, forming a list of onomatopoeic or homophonous characters. A number of sound cells are provided on the front of the 3D dictionary, a sound rod is provided in each sound cell. A holding groove is provided on the front of the 3D dictionary, a printer is placed in the holding groove. The movable-type monosyllabic Chinese characters are used to form the 3D dictionary by changing an existing linear arrangement in an alphabetical order to vertical initial and horizontal final arrangement.

7 Claims, 4 Drawing Sheets

(51) Int. Cl.
*G09B 5/06* (2006.01)
*G09B 19/08* (2006.01)
*F21Y 115/10* (2016.01)

(58) Field of Classification Search
USPC .................. 434/169, 172, 402–405, 407
See application file for complete search history.

(56) References Cited

U.S. PATENT DOCUMENTS

| | | | | |
|---|---|---|---|---|
| 7,011,525 B2* | 3/2006 | Mejia | ............ | G09B 19/04 |
| | | | | 434/167 |
| D590,442 S * | 4/2009 | Jones | ............ | D19/59 |
| 8,459,999 B2* | 6/2013 | Washington | ............ | G09B 5/06 |
| | | | | 434/174 |
| D1,020,922 S * | 4/2024 | Lyang | ............ | D21/499 |
| 2011/0125682 A1* | 5/2011 | Kim | ............ | G09B 11/00 |
| | | | | 706/12 |
| 2011/0171617 A1* | 7/2011 | Yeh | ............ | G06F 3/04886 |
| | | | | 434/157 |
| 2012/0304847 A1* | 12/2012 | Hacker | ............ | G09B 15/00 |
| | | | | 463/35 |
| 2014/0255885 A1* | 9/2014 | Ryu | ............ | G09B 19/08 |
| | | | | 434/157 |
| 2019/0122573 A1* | 4/2019 | Yang | ............ | A63H 33/046 |
| 2020/0098279 A1* | 3/2020 | Al-Khalifa | ............ | G09B 19/06 |
| 2020/0265732 A1* | 8/2020 | Hwang | ............ | G09B 19/06 |

FOREIGN PATENT DOCUMENTS

| | | |
|---|---|---|
| CN | 2228676 Y | 6/1996 |
| CN | 2671048 Y | 1/2005 |
| CN | 204178566 U | 2/2015 |
| CN | 211375835 U | 8/2020 |
| KR | 20110048824 A | 5/2011 |

* cited by examiner

RUBIK'S CUBE OF CHINESE CHARACTERS

FIELD OF THE INVENTION

The present invention relates to the technical field of learning equipment, in particular to a cube of Chinese characters.

DESCRIPTION OF PRIOR ART

Chinese characters are ancient and vibrant, and have the most users in the world, but they are difficult to learn without structured method. At present, most children and foreigners learn Chinese characters or English words with "Chinese Character Card" or "Word Card", which has the following disadvantages: 1. Many cards with lots of characters or words are required and difficult to put away; 2. It is not easy to look up Chinese characters; 3. It is easy to cause confusion and difficult to classify; 4. It lacks systematic learning leading to learning difficulties. Therefore, it is necessary to find a simple and feasible way of learning Chinese characters and English words according to the rules of Chinese characters and Pinyin, which is a meaningful attempt.

Building blocks and Cube are available learning tools and popular among students because they are fun when learning. The Cubes currently available are mainly mathematics and pictures cubes, which are composed of moving blocks marked with colors, color characters, numbers or numeric symbols, making it fun for students to learn numbers and figures. However, cube of Chinese characters has rarely been seen.

Chinese characters are monosyllabic and combinable without singular and plural forms, etc., among which pictophonetic characters account for about 90%. Chinese characters also include onomatopoeia words which come from the sounds of wind, rain, thunder, birds, beasts and insects in the nature.

SUMMARY OF THE INVENTION

The present invention aims to provide a cube of Chinese characters to overcome the drawbacks and deficiencies in the prior art.

In order to achieve the above purpose, the present invention adopts the following technical scheme: a cube of Chinese characters, whereas it comprises a 3D dictionary. The initials are vertically and the finals are horizontally arranged on the front of the 3D dictionary. A character cell is opened at the intersection of each initial and final. A character rod is arranged in each character cell. The phonetic combination corresponding the initial and final is marked on the top of the character rod, forming a list of onomatopoeic or homophonous characters. A number of sound cells and punctuation cells are arranged on the front of the 3D dictionary. A sound rod and a punctuation rod are respectively placed in the sound cell and the punctuation cell. A holding groove is cut on the front of the 3D dictionary. A printer is placed in the holding groove.

Further, a character cap is placed on the top of the character rod. Chinese phonetics is marked on the character cap. Starting with an onomatopoeic character or representative Chinese character, the four tones in Pinyin and Chinese characters corresponding to the tones are arranged on the upper, lower, left and right sides of the character rod according to the rules of onomatopoeia. The Chinese characters, accompanied with their English counterparts, protrude from the surface of the character rod.

Further, the sound rod comprises a vowel rod and a consonant rod, both of which are arranged on the same base. A limiting groove is made in the vowel rod and the base so that the rod can slide on the base. The consonant rod is fixed to the base by magnetism. A bayonet is arranged at the front end of the consonant rod. A matching slot is arranged on the base. The vowel rod and the consonant rod are provided with initials and finals, respectively. Phonetic combinations are formed when the vowel rods and the consonant rods move against one another.

Further, elastic rubber strips are arranged on the inner edges of the character cell and the sound cell. The elastic rubber strips gradually thicken from one end to the other, so that the opening of the character cell or the sound cell gradually decreases from the outside to the inside.

Further, the printer adopts a scroll structure like a bamboo slip scroll, in which partitions are arranged. Character rods are placed in the space formed between the partitions, and fixed to the printers by magnetic attraction or embedding. The characters on the printer and the character rod can form words or sentences.

Further, an acousto-optic system is built in the 3D dictionary, comprising a control circuit, a power supply, a speaker and an LED light arranged in the 3D dictionary, and a positive electrode and a negative electrode placed at the end of the character cell. The control circuit, the power supply, the speaker, the LED light, the positive electrode and the negative electrode form a loop circuit. An arc-shaped elastic sheet and a spring are arranged at the lower end of the positive electrode. The positive electrode contacts the negative electrode under the action of the spring.

Further, a guide rod is arranged in the character cell and the sound cell. A straight groove is cut in the character rod and the sound rod. The straight groove sheathes guide rod.

After adopting the above structure, the present invention has the following beneficial effects:

The present invention uses the movable and spell-out pronunciation feature of Chinese characters to form a 3D dictionary by changing the existing linear arrangement in an alphabetical order to vertical-initial and horizontal-final arrangement, which can help learners look up, recognize and learn Chinese characters quickly according to phonetic rules. In addition, each Chinese character corresponds to an English word, which is conducive to bilingual learning. The present invention is designed with a simple and appropriate structure integrating the look-up, recognizing, reading, using and playing during learning of Chinese characters, which is easy to use and also convenient for use and storage.

DESCRIPTION OF THE REFERENCE NUMERALS

1 3D dictionary; 2 Character cell; 3 Character rod; 31 Character cap; 4 Sound cell; 5 Sound rod; 51 Vowel rod; 52

Consonant rod; 53 Base; 54 Bayonet; 55 Card slot; 6 Holding groove; 7 Printer; 71 Partition; 8 Elastic rubber strip; 9 Control circuit; 10 Power supply; 11 Speaker; 12 LED light; 13 Positive electrode; 14 Negative electrode; 15 Elastic sheet; 16 Spring; 17 Guide rod; 18 Straight groove; 19 Punctuation cell; 20 Punctuation rod

DETAILED DESCRIPTION OF A PREFERRED EMBODIMENT

The present invention will be further described in combination with the drawings.

In order to make it easier to understand the purpose, technical scheme and advantages of the present invention, the present invention is further described in detail below with reference to the accompanying drawings and implementation. It should be understood that the specific embodiment described herein is only used to illustrate the present invention, but not to limit the present invention.

Figure 1:
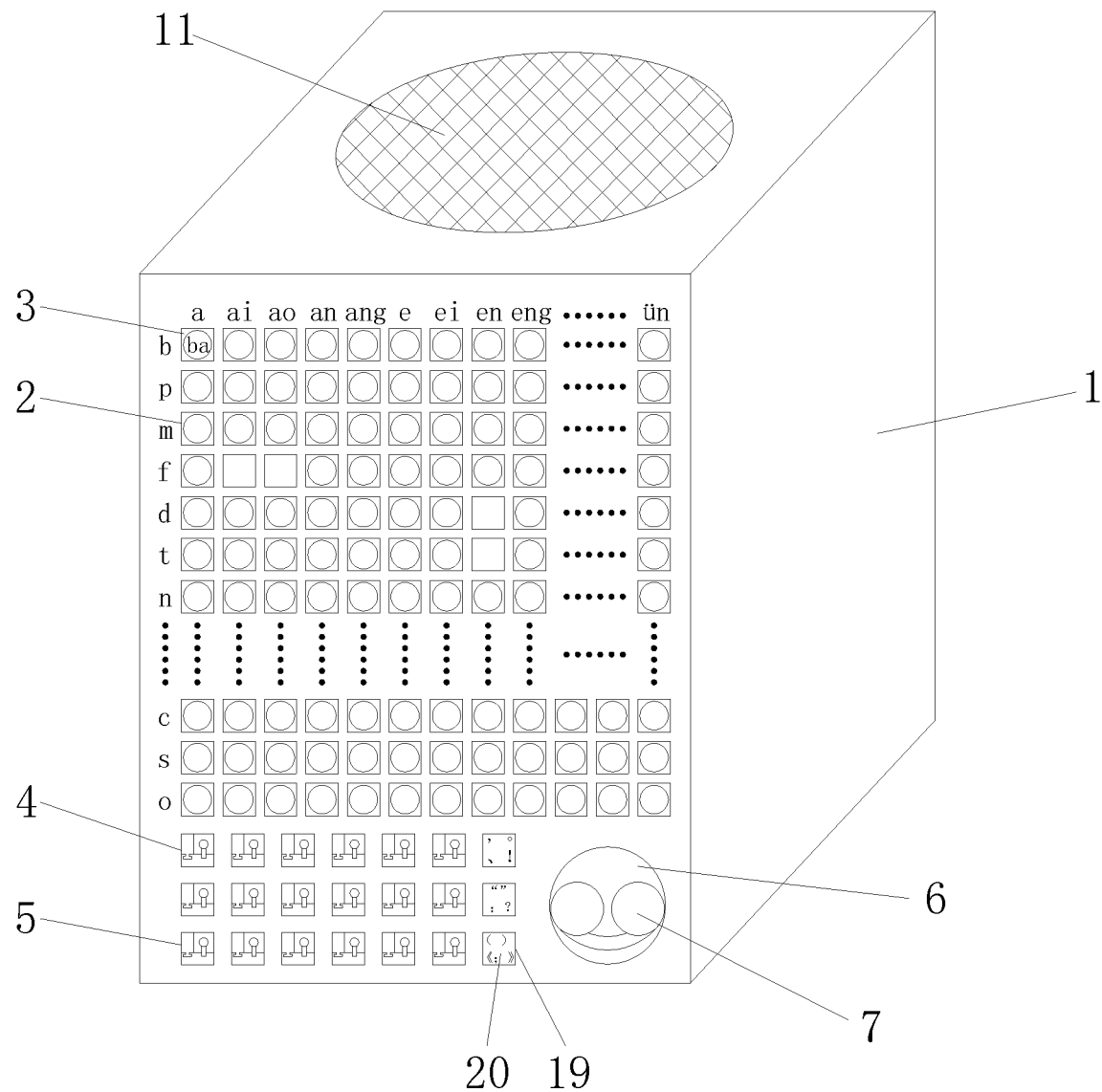
FIG. 1 is a structural schematic diagram of the present invention.
Figure 2:
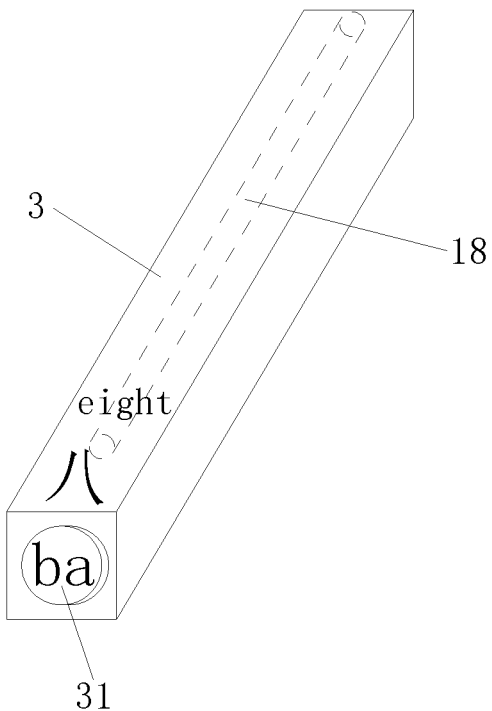
FIG. 2 is a structural schematic diagram of the character rod in the present invention.
Figure 3:
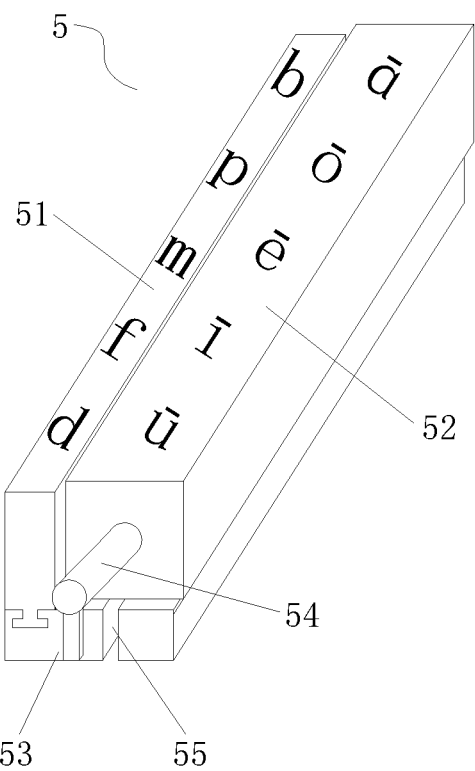
FIG. 3 is a structural schematic diagram of the sound rod in the present invention.
Figure 4:
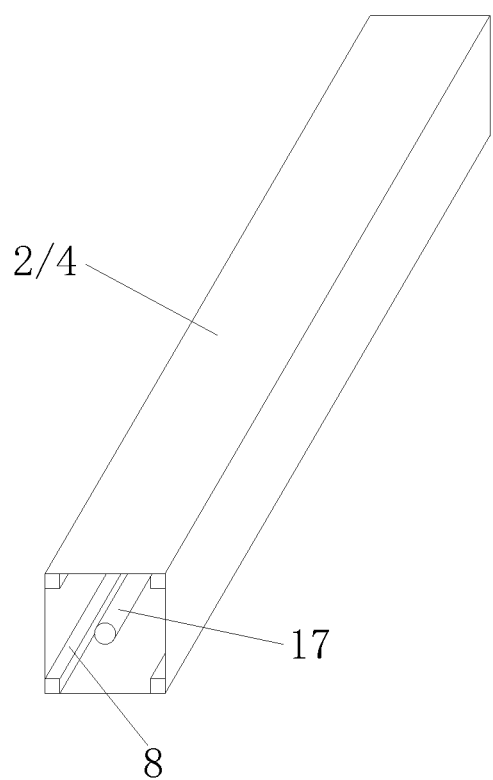
FIG. 4 is a structural schematic diagram of the character cell or sound cell in the present invention.
Figure 5:
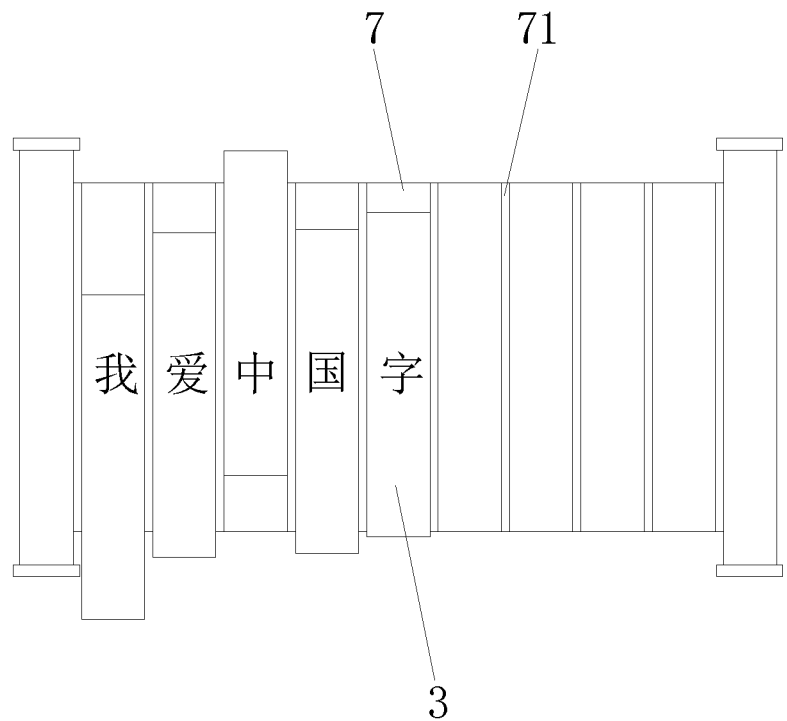
FIG. 5 is a structural schematic diagram of the printer in the present invention.
Figure 6:
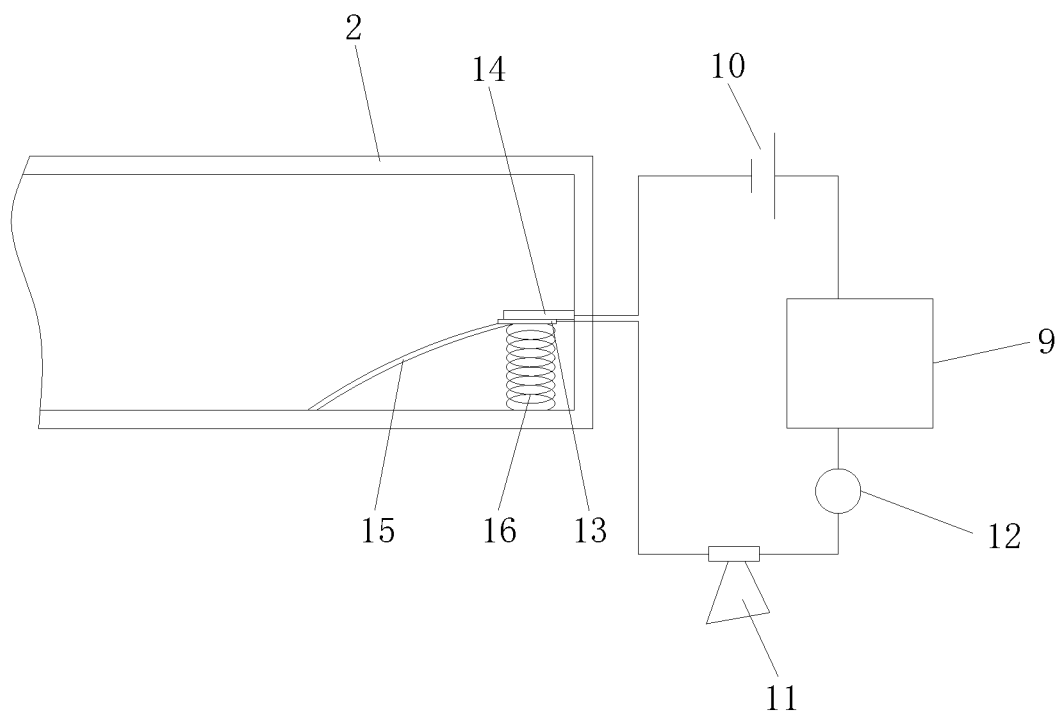
FIG. 6 is a structural schematic diagram of the sound system in the present invention.

FIGS. 1-6 show a cube of Chinese characters, comprising a 3D dictionary (1). The initials are vertically and the finals are horizontally arranged on the front of the 3D dictionary. A character cell (2) is opened at the intersection of each initial and final. A character rod (3) is arranged in each character cell. The phonetic combination corresponding the initial and final is marked on the top of the character rod (3), forming a list of onomatopoeic or homophonous characters. A number of sound cells (5) and punctuation cells (19) are arranged on the front of the 3D dictionary (1). A sound rod (5) and a punctuation rod (20) are respectively arranged in the sound cell (5) and the punctuation cell (19). A holding groove (6) is cut on the front of the 3D dictionary (1). A printer (7) is placed in the holding groove. Some initials and finals can be arranged in the sound rod (5) as no Chinese characters correspond to the combination in it. A matching cover can be arranged on the holding groove (6). The initials in the present invention can be arranged according to the Mandarin syllable table of Chinese characters released by Hu Yushu in 1992. Some initials cannot be combined with finals to represent Chinese characters (such as fao, den, ten, etc.), so there is no need to establish character cells.

In this embodiment, the horizontal finals can be arranged in the order of "open mouth" finals without a medial, "even teeth" finals beginning with [i], "closed mouth" finals beginning with [u], and "round mouth" finals beginning with [y], or in a phonetic alphabet order of a, o, e, i, u, u. The locations of the horizontal finals can be detachable and rearranged in an interchangeable manner.

In this embodiment, the longitudinal initials can be disassembled and rearranged in an interchangeable manner. A row of zero initials can also be arranged.

In this embodiment, a character cap (31) is placed on the top of the character rod (3). Chinese phonetics is marked on the character cap. Starting with an onomatopoeic character or representative character, the four tones in Pinyin and corresponding Chinese characters are arranged on the upper, lower, left and right sides of the character rod (3). The Chinese characters, accompanied with their English counterparts, protrude from the surface of the character rod. The character cap (31) is placed for easily taking out the character rod (3). The four tones are arranged on different sides, and the Chinese characters corresponding to the tones are also arranged on different sides, which is clear and convenient for learning. Meanwhile, corresponding English words are added to facilitate bilingual learning. Phonetic alphabets are marked on the front end of the character rod, followed by onomatopoeic characters (representative characters), and then arranged in the order of common characters, simplified characters, and difficult characters. Different tones are arranged on the four sides of the character rod. Each character can correspond to an English word.

In this embodiment, the sound rod (5) comprises a vowel rod (51) and a consonant rod (52), both of which are arranged on the same base (53). A limiting groove is made in the vowel rod (51) and the base (53) so that the rod can slide on the base. The consonant rod (52) is fixed to the base (53) by magnetism. A bayonet (54) is arranged at the front end of the consonant rod (52). A matching slot (55) is arranged on the base (53). The vowel rod (51) and the consonant rod (52) are provided with initials and finals, respectively. Certain phonetic combinations are formed when the vowel rods and the consonant rods move against one another, with four tones at the four sides of the consonant rod accordingly. Polyphonic characters can be learned by combining character rods and sound rods. When the vowel rod (51) and the consonant rod (52) are moving relative to each other, the sliding contact between the vowel rod (51) and the base (53) by the limiting groove can prevent one end of the vowel rod (51) from tilting and ensure normal use. The bayonet (54) arranged at the front end of the consonant rod (52) can rotate, and it can fit into the slot (55) to fix when the consonant rod (52) is moved and rotated, so as to prevent misalignment and facilitate storage.

In this embodiment, elastic rubber strips (8) are arranged on the inner edges of the character cell (2) and the sound cell (4). The elastic rubber strips (8) gradually thicken from one end to the other, so that the opening of the character cell or sound cell gradually decreases from the outside to the inside. On the one hand, the elastic rubber strip (8) prevents the Chinese characters, phonetic symbols or letters on the character rod (3) and the sound rod (5) from being abraded by the inner wall of the character cell (2) or the sound cell (4). On the other hand, it can clamp the character rod (3) and the sound rod (5).

In this embodiment, the printer (7) adopts a scroll structure like a bamboo slip scroll, in which partitions (71) are arranged on the bamboo slip. Character rods (3) are placed in the space formed between the partitions (71), and fixed to the printers (7) by magnetic attraction or embedding. The characters on the printer (7) and the character rod (3) can form words or sentences. If a character is repeated in a sentence, the character can be replaced by phonetic symbols. According to the principle of movable type printing, a word or a sentence can be formed by taking out a number of character rods (3) based on phonetic symbols, and placed in the printer (7). The Chinese characters are covered by transparent paper, and printed by rubbing on the paper with a pencil or paint to enable beginners to print words or sentences although they cannot write them. This method can also be used for printing and learning foreign languages.

In this embodiment, an acousto-optic system is built in the 3D dictionary (1), comprising a control circuit (9), a power supply (10), a speaker (11) and an LED light (12) arranged in the 3D dictionary, and a positive electrode (13) and a negative electrode (14) arranged at the end of the character cell (2). The control circuit (9), the power supply (10), the speaker (11), the LED light (12), the positive electrode (13) and the negative electrode (14) form a loop circuit. An arc-shaped elastic sheet (15) and a spring (16) are arranged at the lower end of the positive electrode (13). The positive electrode (13) contacts the negative electrode (14) under the action of the spring (16). A positive electrode (13) and a negative electrode (14) are arranged in each character cell (2), representing a pronunciation respectively. When the character rod (3) is in the character cell (2), the end of the character rod (3) is pressed against the elastic sheet (15) to separate the positive electrode (13) from the negative electrode (14). When the character rod (3) is taken out, the positive electrode (13) is energized after contacting the negative electrode (14) under the action of the spring (16). The speaker (11) emits the sound represented by the character rod, and the LED light there lights up. The LED light is preferentially arranged at the front end of the character rod for prompting. The working principle of the acousto-optic system is similar to that of a voice card and will not be described in detail herein. A battery can be used as the power supply (10) and charged through a USB interface.

In this embodiment, a guide rod (17) is arranged in the character cell (2) and the sound cell (3). A straight groove (18) is cut in the character rod (3) and the sound rod (5). The straight groove (18) sheathes guide rod (17), which can guide the installation of the character rod (3) and the sound rod (5) to prevent the characters on the character rod (3) and the sound rod (5) from being abraded due to a deviation in the insertion into the character cell (2) and the sound cell (3).

The above description is illustrative of the technical scheme of the present invention, and is not construed as limiting the invention. Any other modifications or equivalent replacements made by those of ordinary skill in the art thereto shall be covered in the scope of the claims of the present invention without departing from the spirit and scope of the technical scheme of the present invention.

What is claimed is:

1. A cube of Chinese characters, wherein it comprises a 3D dictionary, initials are vertically arranged and finals are horizontally arranged on a front of the 3D dictionary, character cell is provided at an intersection of each initial and each final, a character rod is provided in the character cell, a phonetic combination corresponding the initials and finals is provided on a front of the character rod so as to form a list of onomatopoeic or homophonous characters; a number of sound cells and punctuation cells are provided on the front of the 3D dictionary; a sound rod and a punctuation rod are respectively provided in the sound cells and the punctuation cells, a holding groove is provided on the front of the 3D dictionary, and printer is provided in the holding groove.

2. The cube of Chinese characters according to claim 1, wherein a character cap is provided on the front of the character rod; Chinese phonetics is marked on the character cap, starting with an onomatopoeic character or a representative Chinese character, four tones in Pinyin and corresponding Chinese characters are provided on upper, lower, left and right sides of the character rod according to a rule of onomatopoeia; the Chinese characters, accompanied with their English counterparts, protrude from a surface of the character rod.

3. The cube of Chinese characters according to claim 1, wherein the sound rod comprises a vowel rod and a consonant rod, both of which are provided on a same base; a limiting groove is respectively provided in the vowel rod and the base so that the vowel rod is slidably connected to the base, the consonant rod is fixed to the base by magnetism; a bayonet is arranged at a front end of the consonant rod, a slot is a provided on the base, the vowel rod and the consonant rod are provided with the initials and the finals, respectively, the phonetic combinations is formed when the vowel rod and the consonant rod move toward each other.

4. The cube of Chinese characters according to claim 1, wherein elastic rubber strips are provided on inner edges of the character cell and the sound cells, and each elastic rubber strip gradually thickens from one end to the other end, so that an opening of the character cell or each sound cell gradually decreases from an outside to an inside.

5. The cube of Chinese characters according to claim 1, wherein the printer is a scroll structure in a shape of a bamboo slip scroll, in which partitions are arranged; character rod is placed in a space formed between the partitions, and fixed to the printer by magnetic attraction or embedding, the characters on the printer and the character rod make up words or sentences.

6. The cube of Chinese characters according to claim 1, wherein an acousto-optic system is provided in the 3D dictionary, and comprises a control circuit, a power supply, a speaker and an LED light that are provided in the 3D dictionary, and a positive electrode and a negative electrode provided at an end of the character cell; the control circuit, the power supply, the speaker, the LED light, the positive electrode and the negative electrode form a loop circuit; an arc-shaped elastic sheet and a spring are provided at a lower end of the positive electrode, the positive electrode contacts the negative electrode under an action of the spring.

7. The cube of Chinese characters according to claim 1, wherein a guide rod is provided in the character cell and the sound cells, a straight groove is provided in the character rod and the sound rod, and the straight groove is sleeved on the guide rod.

* * * * *